(12) United States Patent
Iafrate

(10) Patent No.: US 10,215,081 B2
(45) Date of Patent: Feb. 26, 2019

(54) DEGASSING TANK, AND MOTOR VEHICLE COOLING SYSTEM PROVIDED WITH SUCH A DEGASSING TANK

(71) Applicant: ILLINOIS TOOL WORKS INC., Glenview, IL (US)

(72) Inventor: Serge Iafrate, Montmerle sur Saone (FR)

(73) Assignee: ILLINOIS TOOL WORKS INC., Glenview, IL (US)

( * ) Notice: Subject to any disclaimer, the term of this patent is extended or adjusted under 35 U.S.C. 154(b) by 742 days.

(21) Appl. No.: 14/414,334

(22) PCT Filed: Jun. 28, 2013

(86) PCT No.: PCT/IB2013/055317
§ 371 (c)(1),
(2) Date: Jan. 12, 2015

(87) PCT Pub. No.: WO2014/013365
PCT Pub. Date: Jan. 23, 2014

(65) Prior Publication Data
US 2015/0144079 A1   May 28, 2015

(30) Foreign Application Priority Data

Jul. 19, 2012   (FR) ..................................... 12 56987

(51) Int. Cl.
*F01P 11/02*     (2006.01)
*B01D 19/00*     (2006.01)

(52) U.S. Cl.
CPC ............ *F01P 11/028* (2013.01); *B01D 19/00* (2013.01); *F01P 11/029* (2013.01)

(58) Field of Classification Search
CPC ........ F01P 11/028; F01P 11/029; F01P 11/02; F01P 11/04; F01P 3/00; F01P 3/20; B01D 19/00; B01D 19/0042; B01D 19/0068
See application file for complete search history.

(56) References Cited

U.S. PATENT DOCUMENTS 2,023,456 A   12/1935   Wentworth
2,735,414 A *  2/1956   Tacchella .............. F01P 3/2271
                                                    123/41.23
(Continued)

FOREIGN PATENT DOCUMENTS

EP    1554476 A1   7/2005
EP    2042704 A1   4/2009
(Continued)

OTHER PUBLICATIONS

Machine translation of Detailed Description of FR286604 to Merour; Published Aug. 12, 2005; translation obtained from https://worldwide.espacenet.com/; pp. 1-6.*

(Continued)

*Primary Examiner* — Grant Moubry
(74) *Attorney, Agent, or Firm* — Pilloff & Passino LLP; Martin J. Cosenza

(57) ABSTRACT

The present invention relates to a venting tank, suitable for being fitted in a cooling system of a motor vehicle and defining an inner space intended for receiving a coolant, the venting tank including at least one inlet and at least one outlet for the coolant which are arranged below a minimum liquid level when the vehicle is in service, wherein the venting tank also includes, opposite the inlet or at least some of the inlets, a member for guiding the coolant, penetrating into the inner space via the inlet, following a flow directed toward a lower wall of the venting tank opposite the flow arriving through the inlet, and forming a 180-degree arc. The (Continued)

invention also relates to a motor-vehicle cooling system provided with such a venting tank.

21 Claims, 5 Drawing Sheets

(56) References Cited

U.S. PATENT DOCUMENTS

| | | | | |
|---|---|---|---|---|
| 4,997,464 | A | * | 3/1991 | Kopf ................. B01D 19/0063 96/157 |
| 5,884,588 | A | * | 3/1999 | Ap ........................... F01P 11/20 123/41.14 |
| 7,534,354 | B2 | * | 5/2009 | Oserod ................. B01D 17/00 210/703 |
| 7,631,619 | B2 | * | 12/2009 | Bangert ................ F01P 11/028 123/41.54 |
| 8,119,000 | B2 | * | 2/2012 | Oserod ................. B01D 17/00 210/188 |
| 8,440,077 | B2 | * | 5/2013 | Oserod ................. B01D 17/00 210/188 |

FOREIGN PATENT DOCUMENTS

| | | | | |
|---|---|---|---|---|
| FR | 2866064 | A1 | | 8/2005 |
| FR | 2913374 | A1 | | 9/2008 |
| FR | 2915516 | A1 | | 10/2008 |
| GB | 2403163 | A | * 12/2004 | ......... B01D 19/0057 |
| GB | 2404640 | A | * 2/2005 | ............ F01P 11/028 |
| WO | 2004001204 | A1 | | 12/2003 |

OTHER PUBLICATIONS

Machine translation of Detailed Description of WO2004001204 to Youinou; published Dec. 31, 2003; translation obtained from https://worldwide.espacenet.com/; pp. 1-8.*
ISR for PCT/IB2013/055317 dated Nov. 6, 2013.
French Search Report for FR1256987 dated Jan. 25, 2013.

* cited by examiner

DEGASSING TANK, AND MOTOR VEHICLE COOLING SYSTEM PROVIDED WITH SUCH A DEGASSING TANK

RELATED APPLICATIONS

The present application is a National Phase of International Application Number PCT/IB2013/055317 filed Jun. 28, 2013, and claims priority of French Application Number 1256987 filed Jul. 19, 2012.

BACKGROUND

The present invention relates to a degassing tank, adapted for providing a motor vehicle cooling system. The invention also relates to a motor vehicle cooling system, in particular a system for cooling a motor vehicle engine, equipped with such a degassing tank.

SUMMARY

Conventionally, a cooling system comprises a heat transfer circuit formed with various conduits, also called hoses, which extend in the vicinity of the engine and of the radiator of the motor vehicle. The system further comprises a degassing tank, also called an expansion vessel, delimiting an inner volume intended to receive a cooling liquid to be degassed.

In practice, the degassing tank has two main functions. The first consists of allowing thermal expansion of the cooling liquid, by adding an air space above the maximum liquid level in the tank. The second consists of degassing the heat transfer circuit. Indeed, if the circuit is without any gas after manufacturing and before setting the vehicle into operation, there exits a risk of producing gas in the circuit when the vehicle is in operation, for example because of possible slight leaks at the inlet of the water pump or wear of the cylinder head gasket. Thus, by diverting a portion of the heat transfer circuit towards the degassing tank, the cooling liquid may be degassed.

FR-A-2 913 374 describes a cooling system provided with a degassing tank. The tank includes a lower wall and a liquid inlet orifice made in this lower wall. The positioning of the inlet orifice in the lower portion and not in the upper portion of the tank results from operational restrictions of the cooling system. Thus, the inlet orifice is permanently immersed under a minimum liquid level in the tank. A vertical barrier extends in the tank from the lower wall, facing the liquid flow entering through the inlet orifice. The presence of this barrier gives the possibility of slowing down the flow, but a risk of emulsion and of generation of a vortex exists.

FR-A-2 866 064 describes another cooling system provided with a degassing tank. In FIG. 4, the tank includes a guiding tube receiving cooling liquid both from upper tubing and lower tubing. In other words, the guiding tube guides the cooling liquid both from an upper inlet orifice and from a lower inlet orifice. The flow entering the tube through the upper orifice is directed towards a hole positioned in the upper portion of the tube and to a hole positioned in the lower portion of the tube. The liquid flow entering through the upper orifice is expelled through each of these holes as a jet inside the enclosure of the tank. The air jet expelled by the upper hole perturbs the liquid in the reservoir. The underwater jet expelled through the lower hole is directed to the lower wall of the tank, in the continuity of the flow arriving into the tube through the upper tubing. Both upper and lower inflowing flows penetrate into the same tube in an opposite direction, which is unfavorable for stilling the cooling liquid, and therefore for the efficiency of the degassing in the tank. The major portion of both incoming flows is discharged through the lower hole, with a significant rate which may create an emulsion and/or a vortex in the cooling liquid.

The object of the invention is to propose a degassing tank, including an inlet for the cooling liquid in a lower portion, improved relatively to existing tanks.

For this purpose, the object of the present invention is a degassing tank, adapted for providing a motor vehicle cooling system and delimiting an inner volume intended to receive a cooling liquid, the degassing tank comprising at least one inlet orifice and at least one outlet orifice for the cooling liquid which are positioned under a minimum liquid level when the vehicle is in service, wherein the degassing tank also comprises, facing the inlet orifice or at least some of the inlet orifices, a guidance member for the cooling liquid, penetrating into the inner volume through the inlet orifice, following a flow directed towards a lower wall of the degassing tank opposite to the flow arriving through the inlet orifice, forming an arc of 180 degrees.

Thus, the invention gives the possibility of ensuring satisfactory operation of the degassing tank, regardless of the traffic conditions of the vehicle. The guidance member for guiding the flow gives the possibility of producing a fountain internal to the tank, preventing emulsion and generation of a vortex in the cooling liquid. The liquid inlet orifice is permanently immersed under the guidance member, which advantageously has a bell shape. This guidance member also gives the possibility of reducing the flow rate of the liquid flow and therefore giving the possibility of better degassing, as well as suppressing any preferential orientation of the flow around the inlet orifice and therefore limiting the generation of vortices internal to the liquid in the tank.

When the tank comprises several inlet orifices positioned under the minimum liquid level, at least some of these orifices may be capped with a guidance member. Preferably, the tank comprises a guidance member positioned facing each of these inlet orifices.

According to other advantageous features of the invention, taken individually or as a combination:
- The guidance member is devoid of any liquid inlet orifice from an upper wall of the degassing tank.
- Said or each inlet orifice positioned under a minimum liquid level when the vehicle is in service is made in the lower wall.
- Said or each outlet orifice positioned under a minimum liquid level when the vehicle is in service is made in the lower wall.
- The guidance member forms a bell including an aperture located between the lower wall and the inlet orifice under the minimum liquid level.
- The aperture is open over 360 degrees around the inlet orifice.
- The guidance member partly surrounds a liquid inlet tube, which extends in the inner volume from the lower wall as far as the inlet orifice, under the minimum liquid level.
- The guidance member extends towards the lower wall from an upper wall of the degassing tank and includes an orifice for balancing the pressures.
- The orifice for balancing the pressures is positioned above a maximum liquid level in the inner volume when the vehicle is in service.

The guidance member is anchored to a side wall of the lower wall and partly extends between the lower wall and the inlet orifice.

The tank comprises a barrier which extends into the inner volume from the lower wall between the inlet orifice and the guidance member on the one hand and the outlet orifice on the other hand.

The barrier is devoid of any orifice directly made between the inlet orifice and the outlet orifice.

The tank comprises an external tube and an inlet tube which extend on either side of the side wall, respectively out of the inner volume and in the inner volume as far as the inlet orifice.

The tank comprises several inlet orifices and several guidance members; each positioned facing one of the inlet orifices.

The object of the invention is also a motor vehicle cooling system, provided with a degassing tank as mentioned above.

BRIEF DESCRIPTION OF THE DRAWINGS

The invention will be better understood upon reading the description which follows, only given as a non-limiting example and made with reference to the appended drawings wherein.

DETAILED DESCRIPTION OF THE DRAWINGS

In FIGS. 1 to 4, is illustrated a degassing tank 10 according to the invention.

Figure 1:
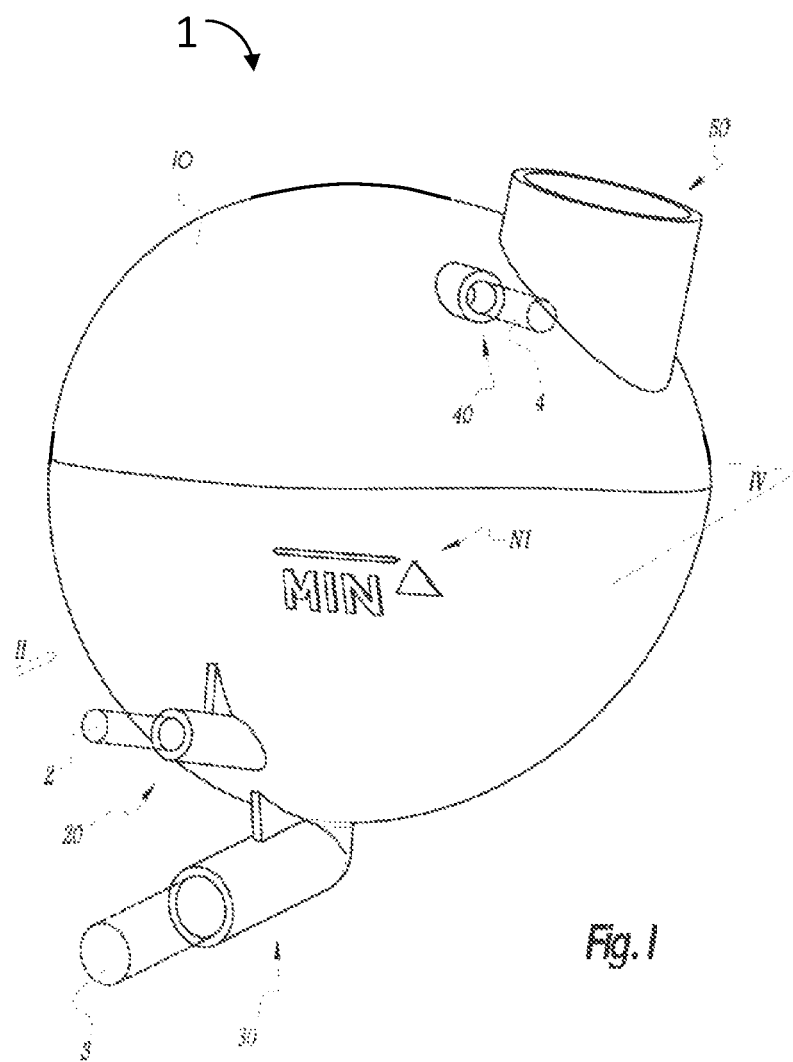
FIG. 1 is a perspective view of a degassing tank according to the invention, adapted for receiving a cooling liquid circulating in a cooling system also compliant with the invention.

This tank 10 is adapted for providing a cooling system 1 of a motor vehicle engine, also according to the invention and partly illustrated in FIG. 1. An exemplary system 1 is described in FR-A-2 913 374.

The system 1 comprises various devices, such as the degassing tank 10, connected through a heat transfer circuit in which notably circulates a cooling liquid L. The circuit of the system 1 comprises conduits or hoses, such as the conduits 2, 3 and 4 which are partly and schematically illustrated in dotted lines in FIG. 1. The system 1 and the tank 10 are positioned in the engine compartment of the vehicle.

The tank 10 comprises an upper shell 12 and a lower shell 14 delimiting an inner volume V10. The tank 10 has a globally ovoidal shape. Alternatively, the tank 10 may have any shape adapted to the present application. The shells 12 and 14 are sealably joined together at an assembly plane P10, corresponding to a substantially horizontal medium plane in FIGS. 2 and 3. Each shell 12 and 14 includes a concave inner wall, respectively 16 and 18. The walls 16 and 18 are sealably connected to the level of plane P10.

Figure 2:
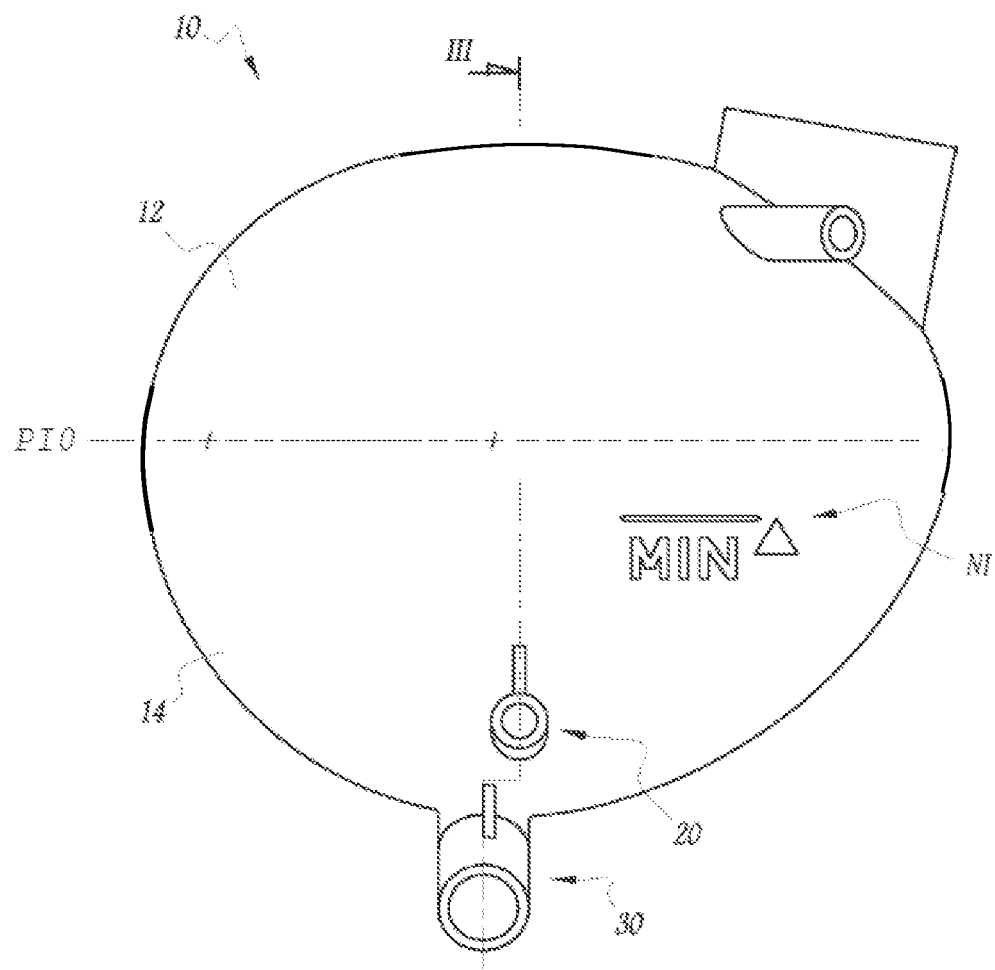
FIG. 2 is a side view of the tank along the arrow II in FIG. 1.
Figure 3:
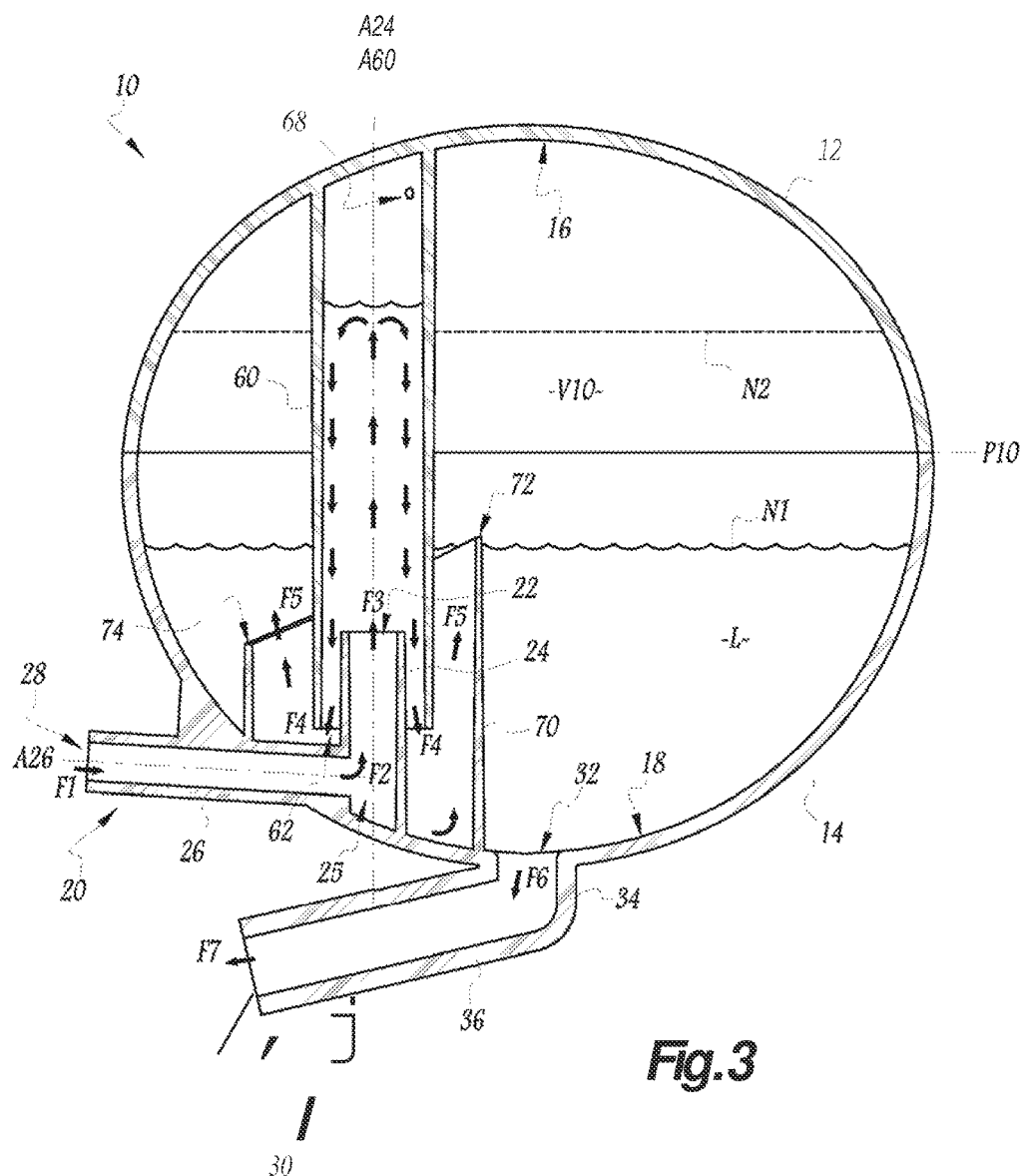
FIG. 3 is a sectional view of the reservoir along the line III-III in FIG. 2.

The horizontal plane P10 defines a theoretical reference position of the tank 10, when the wheels of the vehicle lie on a substantially horizontal ground. As shown in FIG. 3, a minimum level N1 and a maximum level N2 of liquid L are defined in the inner volume V10 of the tank 10. In the example of the figures, the minimum level N1 is located below the plane P10, while the maximum level N2 is located above the plane P10, parallel to this plane P10 in the reference position of the tank 10. Alternatively, the position of the levels N1 and N2 may depend on the targeted application. The difference of liquid L between the levels N1 and N2 is currently designated as a «consumable» difference. Practically, the minimum level N1 may be located on an external surface of the lower shell 14, as shown in FIGS. 1 and 2. Additionally, the level N2 may also be located on the upper shell 14.

Subsequently, in order to facilitate the localization in space, the terms of «upper, lower, vertical, horizontal» are defined relatively to the reference horizontal plane P10. Further, the terms of «internal, external, inlet and outlet» are defined relatively to the inner volume V10.

In practice, the tilt of the tank 10 and/or of the liquid L level may vary when the vehicle is in service, for example during acceleration or braking, in bends or on a rugged road. In this case, the movements of the liquid L present in the tank 10, notably relatively to the levels N1 and N2, may perturb the operation of the degassing tank 10. By means of the invention, as detailed hereafter, the tank 10 has satisfactory operation regardless of the traffic conditions of the vehicle.

The reservoir 10 also comprises tubings 20 and 30 formed on the lower shell 14, as well as tubings 40 and 50 formed on the upper shell 12. The tubing 20 forms a means for introducing liquid L into the tank 10, for example from a radiator close to the engine or from the cylinder head of the engine, via the conduit 2. The tubing 30, also called a loading pipe, forms a means for outflow of liquid L out of the tank 10, towards the engine 2, via the conduit 3. The tubing 40 forms a means for connecting the tank 10 with another device of the system 1, for example a thermostat close to the radiator, via the conduit 4. The tubing 50 forms a means for accessing the inner volume V10 of the tank 10. This tubing 50 may comprise an external thread or an internal tapped thread, not illustrated for simplification purposes, allowing a plug to be screwed on.

The tubing 20 for introducing liquid L extends both in the inner volume V10 and out of the inner volume V10 of the tank 10. From the inside to the outside, the tubing 20 comprises an internal orifice 22, an internal tube 24, a bend 25, an external tube 26 and an external orifice 28. The bend 25 is located at the junction between the internal tube 24 and the external tube 26. The internal tube 24 extends vertically along an axis A24, from the wall 18 in the volume V10. The external tube 26 extends globally horizontally along an axis A26 directed upwards running away from the shell 14 on the outside of the volume V10. In the example of the figures, the axis A24 and A26 are tilted by an angle of 86 degrees at the bend 25. In practice, any tilt between the axis A24 and A26 may be contemplated. The orifice 22 for introducing liquid L into the volume V10 is located at the upper end of the tube 24, under the minimum liquid level N1. Regardless of the tilt of the vehicle when in service, the level N1 is maintained above the orifice 22 in order to allow satisfactory operation of the tank 10 and of the system 1. The orifice 28 is located at the external end of the tube 26, provided so as to be connected to the conduit 2 for feeding the tank 10 with liquid L.

The tubing 30 for outflow of liquid L extends outside the inner volume V10 of the tank 10. From the inside to the outside, the tubing 30 comprises an internal orifice 32, a bent tubular portion 34, an external tube 36 and an external orifice 38. The orifice 32 for outflow of liquid L out of the volume V10 is made in the lower wall 18 under the minimum liquid level N1. This orifice 32 is substantially located at the centre of the tank 10, at the lowest point of the volume V10 in the reference position. Alternatively, the orifice 32 may be located in any point of the wall 18. The orifice 38 is located at the external end of the tube 36, which is directed downwards running away from the shell 14 and is provided for being connected to the conduit 3. In practice, any tilt of the tube 36 relatively to the shell 14 may be contemplated.

The tank 10 also comprises a member 60 for guiding the liquid L penetrating into the volume V10 through the inlet orifice 22. The member 60 has a globally tubular shape, centred on an axis A60 which is coaxial with the axis A24 of the tube 24. The member 60 is positioned facing the inlet orifice 22. The member 60 extends towards the lower wall 18 from the upper wall 16, as far as an aperture 62 located between the lower wall 18 and the orifice 22. The member 60 thus forms a bell which surrounds the inlet orifice 22 and partly the tube 24, with the aperture 62 which is open over 360 degrees around the axis A24 and A60, of the orifice 22 and of the tube 24. The diameter of the aperture 62 around the axis A60 is greater than the diameter of the aperture 22 and of the tube 24 around the axis A24. The aperture 62 is permanently immersed under the minimum liquid level N1, regardless of the tilt of the vehicle and of the tank 10.

Preferably, the member 60 permanently includes a through-orifice 68, made near the upper wall 16. Still preferably, this orifice 68 is permanently positioned above the maximum liquid level N2 in the inner volume V10 when the vehicle is in service. The orifice 68 gives the possibility of balancing the pressures in the volume V10, between the inside and the outside of the member 60.

Figure 4:
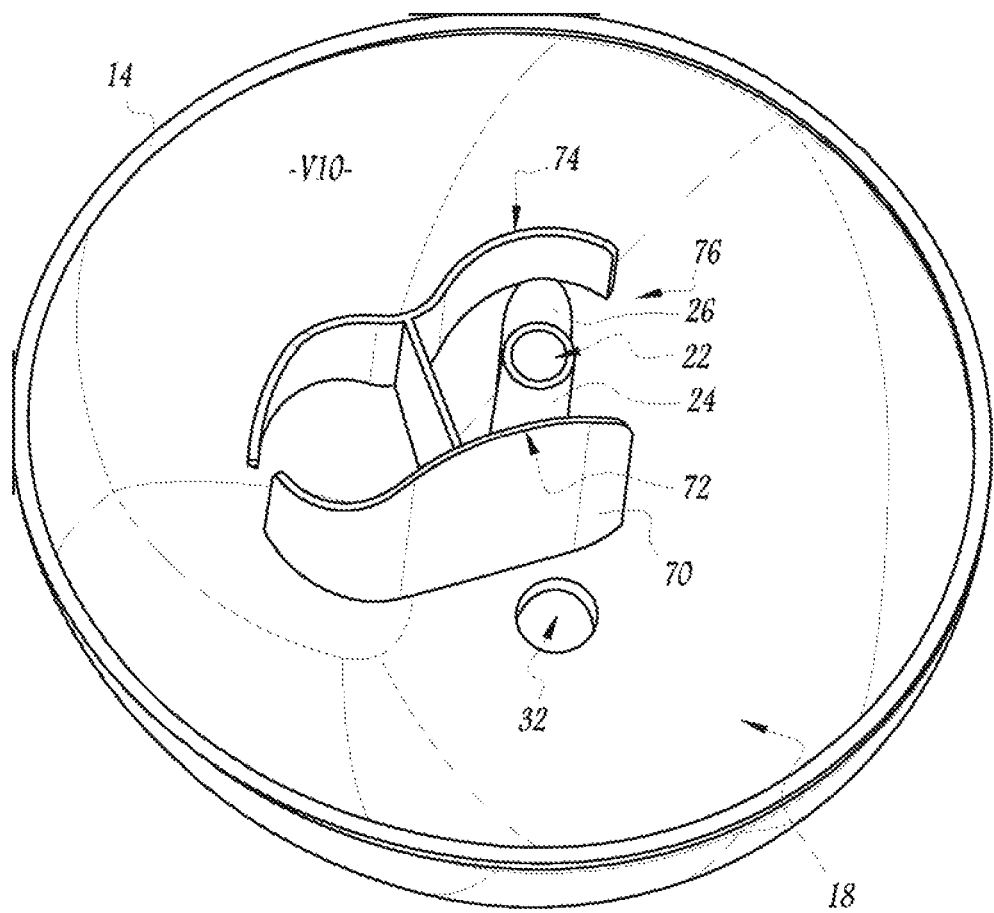
FIG. 4 is a sectional view in the plane IV in FIG. 1, showing a perspective view of the inside of the lower shell of the tank.

The tank 10 also comprises a barrier 70, shown in FIGS. 3 and 4. The barrier 70 extends in the volume V10 from the lower wall 18 as far as edges 72 and 74 which have different heights. An aperture 76 is also made in the barrier 70, between the edges 72 and 74. In other words, this aperture 76 corresponds to an absence of a barrier 70. The barrier 70 is without any orifice made in its bulk directly between the inlet orifice 22 and the outlet orifice 32, in a straight line between both orifices 22 and 32, notably at the lower wall 18. Except at the level of this aperture 76, the barrier 70 surrounds the orifice 22, the tube 24, the member 60 and the aperture 62. The edge 72 of the barrier 70 is interposed between the inlet orifice 22 and the guidance member 60 on the one hand and the outlet orifice 32 of liquid L on the other hand. The edge 74 is located opposite the edge 72 and the orifice 32 relatively to the tube 24 and the member 60. The height of the edge 72 measured vertically relatively to the wall 18, is greater than the height of the edge 74. In the reference position of the tank 10, the edge 72 is substantially located at the height of the minimum level N1.

In practice, the degassing function of the tank 10 has to be ensured regardless of the circulation conditions of the vehicle, i.e. no gas bubble should be included in the liquid L at the outlet tubing 30. The efficiency of degassing will be all the better since the air inclusions are avoided upon introducing the liquid L into the tank 10, at the tubing 20. Due to the small diameters of the tubes 26 and 24 belonging to the tubing 20 for introducing a liquid L, notably as compared with the tubing 30 and the conduits 2 and 3 of the circuit, the velocity of the liquid L penetrating into the tank 10 is relatively high. When this liquid L comes into contact with internal portions of the tank 10, it tends to emulsify.

As shown in FIG. 3, the tank 10 is crossed by flows F1, F2, F3, F4, F5, F6 and F7 of cooling liquid L, when the vehicle is in service and the tank 10 ensures its thermal expansion and degassing functions for the liquid L.

The flow F1 penetrates into the tubing 20 at the orifice 28, with significant velocity and flow rate. This flow F1 is globally directed downwards, in the example of the Figures, along the axis A26 along the tube 26. The flow F2 performs a turn at the bend 25, by passing from the tube 26 to the tube 24. The flow F2 moves up vertically along the tube 24 along the axis A24. The flow F3 emerges from the tube 24 through the orifice 22 for introducing the liquid into the volume V10. At this stage, the flow F3 of liquid L leaves the tubing 20 in order to penetrate into the volume V10, along a vertical direction directed upwards and towards the liquid L level. Without the presence of the member 60, the flows F2 and F3 would cause emulsification of the liquid L and the generation of a vortex, which may again provide gas to the liquid L, in the volume V10 of the tank 10.

By means of the presence of the member 60, the flow F3 will not disturb the liquid L present in the tank 10. The flow F3 flows up along the member 60 towards the upper wall 16, as far as a liquid L height which depends on the flow rate of the flow F1 penetrating into the tubing 20. The member 60 then guides the flow F3, along its internal walls, following the flow F4 directed against the lower wall 18, i.e. following a vertical direction directed downwards and opposing the flow F3 arriving through the orifice 22. Between the flow F3 directed upwards and the flow F4 directed downwards, the liquid L is guided along an arc of 180 degrees between the member 60 and the tube 24, towards the lower wall 18, as far as the aperture 62.

By forming an internal fountain with the flows F2, F3 and F4, the tubing 20 and the member 60 prevent emulsification and generation of vortices in the volume V10 of the tank 10. If an emulsion is produced above the orifice 22 because of the velocity of the flows F2 and F3, this emulsion is contained by the member 60 for guiding the flow F4 downwards so that the liquid L is not again filled with gas. As the aperture 62 of the member 60 is made over 360 degrees around the orifice 22 and the tube 24, the flow F4 does not have any preferential orientation and is regularly distributed around the tube 24, which avoids the formation of vortices internal to the liquid L contained in the volume V10. Because of the increase in the passage section for the liquid L between the tube 24 and the member 60, the flow rate of the flow F4 is reduced relatively to the flow F3, which improves the degassing efficiency.

By interposing the barrier 70 between the aperture 62 and the orifice 32, the risk of again providing gas to the liquid L before its leaving of the tank 10 through the orifice 32 is further reduced. The flow F4 is directed towards the wall 18, and then against the barrier 70, and then diffuses into the volume V10 by forming a flow F5 guided by this barrier 70 under the minimum liquid level N1. Because of the configuration of this barrier 70, the flow F5 is directed preferentially towards the aperture 76 and the edge 74 of a smaller height than the edge 72. At this stage, a possible emulsion resulting from the velocity of the flows F2 and F3 is dissipated and the flow F5 circumvents the barrier 70 in order to be directed towards the outlet orifice 32. Moreover, if the tank 10 and/or the liquid L level are tilted to one side or the other, the position and the height of the edges 72 and 74 of the barrier 70 give the possibility of ensuring that the orifice 22, the tube 24 and the aperture 62 are always immersed under the minimum liquid level N1.

The flow F5 penetrates into the orifice 32 as a flow F6 leaving the volume V10, and then escapes from the tubing 30 through the orifice 38 as a flow F7.

Thus, the coolant liquid L is degassed in the tank 10 following the flows F1 to F7. The tubings 20 and 30, the member 60 and the barrier 70 form together means for guiding the flows F1 to F7 of liquid L. The configuration of these elements 20, 30, 60 and 70 give the possibility of ensuring proper operation of the tank 10 regardless of the circulation conditions of the vehicle.

Within the scope of the invention, the member 60 is without any orifice for introducing liquid L from an upper portion of the tank 10, notably from the upper wall 16, unlike the tank described in FIG. 4 of FR-A-2 866 064. Even in the case when the tank 10 comprises an orifice for introducing liquid L made in the upper wall 16, this upper flow does not penetrate into the member 60 in order to mix with the flows F3 and F4 from the inlet orifice 22. In other words, this upper flow penetrates into the inner volume V10 of the tank 10 without penetrating into the member 60. The so-called upper and lower inflowing flows are then separated, which promotes stilling of the cooling liquid L and increases the degassing efficiency in the tank 10.

Figure 5:
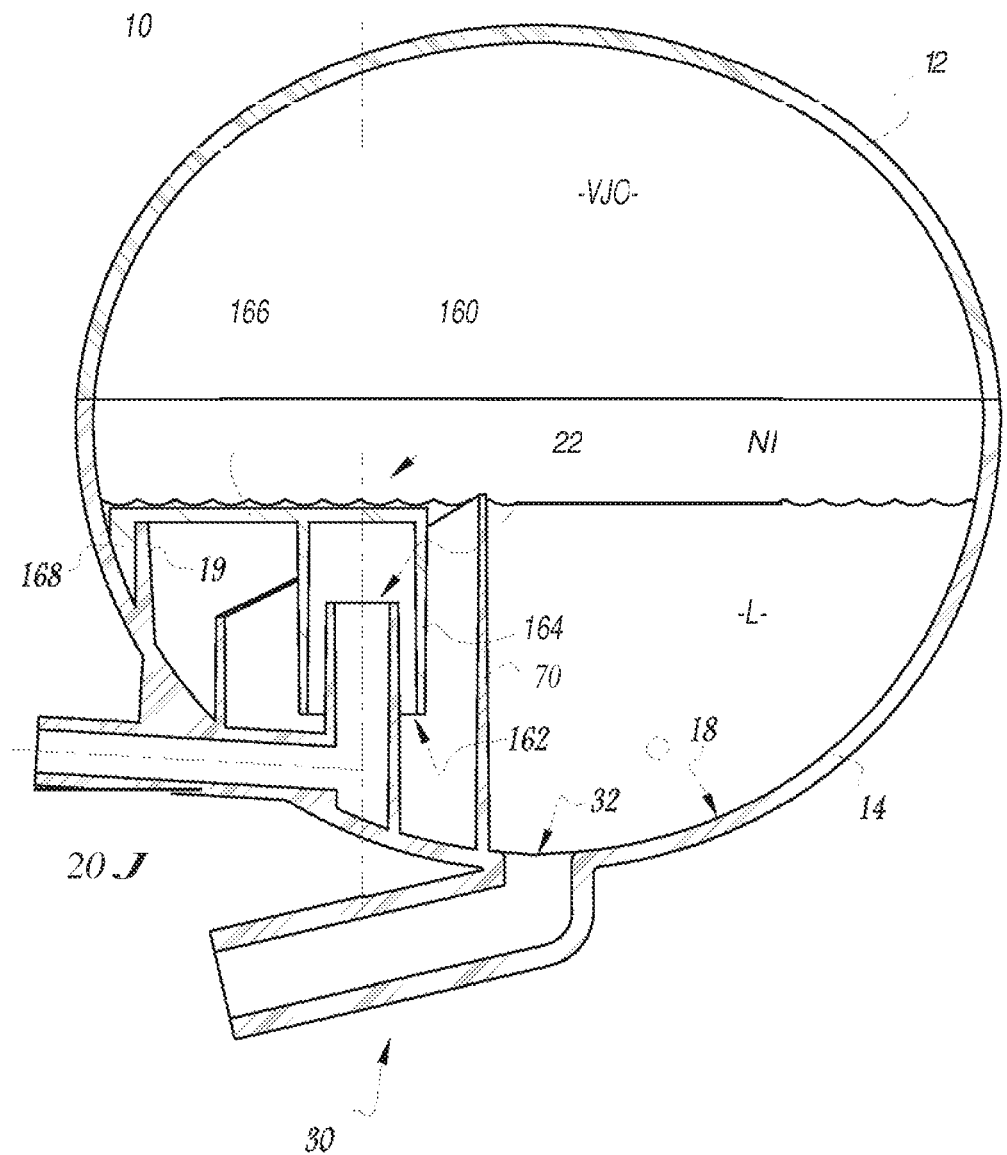
FIG. 5 is a sectional view similar to FIG. 3 of a degassing tank according to a second embodiment of the invention.

In FIG. 5 is illustrated a member 160 belonging to a second embodiment of a degassing tank 10 according to the invention.

Certain constitutive elements of the tank 10 are identical with those of the first embodiment, described above, and bear the same numerical references. The liquid L flows are not illustrated in the FIG. 5 for simplification purposes, but these flows are similar to those illustrated in FIG. 3. The main difference with the first embodiment relates to the guidance member 160, which has a similar operation, but a different structure, as compared with the guidance member 60 described above.

The member 160 includes an aperture 162, a tube 164, a plate 166 and an anchoring portion 168. The member 160 extends between the inlet orifice 22 and the minimum liquid level N1. The plate 166 is attached, at the anchoring portion 168 to an additional anchoring portion 19 made laterally on the lower wall 18 of the tank 10. The anchoring portions 19 and 168 may exhibit any additional configuration adapted to the present application. The tube 164 extends from the plate 166 towards the lower wall 18 of the tank 10. The tube 164 is open at the aperture 162 and closed at the plate 166. The tube 164 forms a bell which pushes back the liquid L flow towards the lower wall 18 to the tank 10, along the tube 24.

Moreover, the system 1 or the tank 10 may be conformed differently from the figures without departing from the scope of the invention. In particular, the tubings 20 and 30, the member 60 or 160 and/or the barrier 70 may each exhibit a different configuration without departing from the scope of the invention.

As an alternative not shown, the guidance member may have any bell shape adapted for pushing back the flow F4 of liquid L against the lower wall 18 of the tank 10. This guidance member extends at least partly between the lower wall 18 and the inlet orifice 22, under the minimum liquid level N1.

According to another alternative not shown, the tube 24 and the guidance member 60 or 160 may be brought closer to the centre of the tank 10, while the orifice 32 is slightly shifted from the centre, as compared with the figures.

According to another alternative not shown, the axis A24 and A60 may be slightly shifted and not strictly coaxial.

According to another alternative not shown, the tank 10 does not include any barrier 70. In this case, the presence of the member 60 or 160 is sufficient for guiding the flow of liquid L, while preventing emulsification and generation of vortices.

According to another alternative not shown, the tank 10 may have a shape other than an ovoid, for example a spherical or any shape.

According to another alternative not shown, the tank 10 does not include any tubing 40 formed on the upper shell 12. For example, as detailed hereafter, the tubing 40 may be formed on the lower shell 14 and form an additional inlet for liquid into the tank 10.

In practice, the degassing tank 10 according to the invention may comprise several tubings, inlet orifices 22 and/or outlet orifices 32 provided on the side of the lower shell 14. In other words, the tank 10 according to the invention comprises at least one inlet orifice 22 and at least one outlet orifice 32 for the cooling liquid L positioned under the minimum liquid level N1 when the vehicle is in service. In this case, at least some of the inlet orifices 22, preferably each inlet orifice 22, is associated with its own guidance member 60 or 160, positioned facing this inlet orifice 22.

Further, the technical features of the various embodiments may in totality or for some of them be combined together. Thus, the degassing tank may be adapted in terms of structure, functionality, cost and performance.

The invention claimed is:

1. A degassing tank, adapted to equip a motor vehicle cooling system and delimiting an inner volume intended to receive a cooling liquid, the degassing tank comprising at least one inlet orifice and at least one outlet orifice for the cooling liquid which are positioned under a minimum liquid level when the motor vehicle is in service, wherein the degassing tank also comprises, facing the inlet orifice or at least some of the inlet orifices, a guidance member for guiding the cooling liquid, penetrating into the inner volume through the inlet orifice, following a flow directed towards a lower wall of the degassing tank opposite to the flow arriving through the inlet orifice, forming an arc of 180 degrees, the guidance member is anchored at a lateral portion of the lower wall and partly extends between the lower wall and the inlet orifice.

2. The degassing tank according to claim 1, wherein the guidance member is devoid of any inlet orifice for introducing a liquid from an upper wall of the degassing tank.

3. The degassing tank according to claim 1, wherein the at least one inlet orifice positioned under a minimum liquid level when the motor vehicle is in service is made in the lower wall.

4. The degassing tank according to claim 1, wherein the at least one outlet orifice positioned under the minimum liquid level when the motor vehicle is in service is made in the lower wall.

5. The degassing tank according to claim 1, wherein the guidance member forms a bell including an aperture located between the lower wall and the inlet orifice under the minimum liquid level.

6. The degassing tank according to claim 5, wherein the aperture is open over 360 degrees around the inlet orifice.

7. The degassing tank according to claim 1, wherein the guidance member partly surrounds a tube for introducing liquid, which extends in the inner volume from the lower wall as far as the inlet orifice, under the minimum liquid level.

8. The degassing tank according to claim 1, wherein the guidance member extends towards the lower wall from an upper wall of the degassing tank and includes an orifice for balancing pressures between an inside and an outside of the guidance member, within the inner volume.

9. The degassing tank according to claim 8, wherein the orifice for balancing the pressures is positioned above a maximum liquid level in the inner volume when the motor vehicle is in service.

10. The degassing tank according to claim 1, further comprising a barrier which extends in the inner volume from the lower wall between the at least one inlet orifice and the guidance member and the at least one outlet orifice.

11. The degassing tank according to claim 10, wherein the barrier is devoid of any orifice directly made between the inlet orifice and the outlet orifice.

12. The degassing tank according to claim 1, further comprising an external tube and an inlet tube which extend on either side of the lower wall, respectively out of the inner volume and in the inner volume as far as the inlet orifice.

13. The degassing tank according to claim 1, further comprising several inlet orifices and several guidance members, each positioned facing one of the inlet orifices.

14. A motor vehicle cooling system comprising the degassing tank according to claim 1, wherein the liquid level inside the guidance member is above a maximum liquid level when the motor vehicle is in service.

15. The degassing tank according to claim 1, wherein at least one inlet orifice and at least one outlet orifice are located below the minimum liquid level.

16. The degassing tank according to claim 1, wherein the guidance member is devoid of any inlet orifice for introducing a liquid from an upper wall of the degassing tank, wherein the at least one inlet orifice positioned under a minimum liquid level when the motor vehicle is in service is made in the lower wall, and wherein the at least one-outlet orifice positioned under a minimum liquid level when the motor vehicle is in service is made in the lower wall.

17. The degassing tank according to claim 1, wherein the guidance member forms a bell devoid of any inlet orifice for introducing a liquid from an upper wall of the degassing tank.

18. A degassing tank, adapted to equip a motor vehicle cooling system and delimiting an inner volume intended to receive a cooling liquid, the degassing tank comprising at least one inlet orifice and at least one outlet orifice for the cooling liquid which are positioned under a minimum liquid level when the motor vehicle is in service, wherein the degassing tank also comprises, facing the inlet orifice or at least some of the inlet orifices, a guidance member for guiding the cooling liquid, penetrating into the inner volume through the inlet orifice, following a flow directed towards a lower wall of the degassing tank opposite to the flow arriving through the inlet orifice, forming an arc of 180 degrees, wherein a liquid level inside the guidance member is above the minimum liquid level when the motor vehicle is in service, wherein the guidance member is anchored at a lateral portion of the lower wall and partly extends between the lower wall and the inlet orifice.

19. The degassing tank according to claim 18, wherein the liquid level inside the guidance member is between the minimum liquid level and a maximum liquid level when the motor vehicle is in service.

20. The degassing tank according to claim 18, wherein at least one inlet orifice and at least one outlet orifice are both located below the minimum liquid level.

21. A vehicle, comprising:
a motor in service; and
a structure establishing a degassing tank configured to equip a motor vehicle cooling system and delimiting an inner volume intended to receive a cooling liquid, the degassing tank comprising at least one inlet orifice and at least one outlet orifice for the cooling liquid which are positioned under a liquid level, wherein the degassing tank also comprises, facing the inlet orifice or at least some of the inlet orifices, a guidance member for guiding the cooling liquid, penetrating into the inner volume through the inlet orifice, following a flow directed towards a lower wall of the degassing tank opposite to the flow arriving through the inlet orifice, forming an arc of 180 degrees, wherein a liquid level inside the guidance member is above the minimum liquid level when the motor vehicle is in service, wherein the guidance member is anchored at a lateral portion of the lower wall and partly extends between the lower wall and the inlet orifice.

* * * * *